US008767760B2

(12) United States Patent
Andreozzi et al.

(10) Patent No.: US 8,767,760 B2
(45) Date of Patent: Jul. 1, 2014

(54) METHOD AND SYSTEM FOR HANDLING QUEUES IN COMMUNICATION NETWORKS, CORRESPONDING COMPUTER PROGRAM PRODUCT

(75) Inventors: Matteo Maria Andreozzi, Pisa (IT); Marco Caretti, Turin (IT); Daniele Franceschini, Turin (IT); Roberto Rossi, Genoa (IT); Dario Sabella, Turin (IT); Giovanni Stea, Pisa (IT)

(73) Assignee: Telecom Italia S.p.A., Milan (IT)

( * ) Notice: Subject to any disclaimer, the term of this patent is extended or adjusted under 35 U.S.C. 154(b) by 85 days.

(21) Appl. No.: 13/639,373

(22) PCT Filed: Apr. 6, 2010

(86) PCT No.: PCT/EP2010/002160
§ 371 (c)(1),
(2), (4) Date: Oct. 4, 2012

(87) PCT Pub. No.: WO2011/124235
PCT Pub. Date: Oct. 13, 2011

(65) Prior Publication Data
US 2013/0028220 A1 Jan. 31, 2013

(51) Int. Cl.
*H04L 12/28* (2006.01)

(52) U.S. Cl.
USPC ............................ 370/412; 370/338; 370/235

(58) Field of Classification Search
None
See application file for complete search history.

(56) References Cited

U.S. PATENT DOCUMENTS

2010/0278152 A1  11/2010  Andreozzi et al.
2011/0103395 A1*  5/2011  Ratnakar et al. ............. 370/412
2013/0083654 A1*  4/2013  Lee et al. ..................... 370/230

FOREIGN PATENT DOCUMENTS

EP      1 885 090 A1  2/2005
EP      2 117 186 A1  11/2009
WO   WO 2009/080081 A1  7/2009

OTHER PUBLICATIONS

"$3^{rd}$ Generation Partnership Project; Technical Specification Group Radio Access Network; FDD Enhanced Uplink; Overall description; Stage 2 (Release 6)", 3GPP TS 25.309V6 6.0, pp. 2-34, (2006).
International Search Report from the European Patent Office in International Application No. PCT/EP2010/002180 mailed Feb. 14, 2011.
Qiu, et al, "Hierarchy Virtual Queue Based Flow Control in LTE/SAE", 2010 Second international Conference on Future Networks, Second International Conference on IEEE, Piscataway, NJ, USA, XP031848880. ISBN: 978-0-7695-3940-9, pp. 78-82, (Jan. 22, 2010).

(Continued)

*Primary Examiner* — Duc C Ho
(74) *Attorney, Agent, or Firm* — Oblon, Spivak, McClelland, Maier & Neustadt, L.L.P.

(57) ABSTRACT

In a communication network, a node receives from user equipment information on the length of a queue of information units to be transmitted to the node from the user equipment. The information, for possible use by the node in scheduling transmission of these information units from the user equipment, is in the form of quantized queue length information indicative of a lower bound and an upper bound for the queue length. Transmission of information units from the user equipment to the node is detected at the node, and an improved estimate of the queue length is produced by correcting the lower bound and the upper bound via subtraction of the number of the detected information units transmitted from the user equipment to the node.

11 Claims, 3 Drawing Sheets

(56) References Cited

OTHER PUBLICATIONS

Andreozzi, et al., "Flexible Scheduling for Real-Time Services in High-Speed Packet Access Cellular Networks", Wireless Conference, European, IEEE, Piscataway, NJ, USA, XP031583298, ISBN: 978-1-4244-5935-3, pp. 1-5, (May 17, 2009).

Wang, et al., "Performance of VoIP on HSDPA", 0-7803-8887-9/05, Proceedings of IEEE VTC Spring '05 Meeting, pp. 1-5, (2005).

\* cited by examiner

METHOD AND SYSTEM FOR HANDLING QUEUES IN COMMUNICATION NETWORKS, CORRESPONDING COMPUTER PROGRAM PRODUCT

CROSS REFERENCE TO RELATED APPLICATION

This application is a national phase application based on PCT/EP2010/002160, filed Apr. 6, 2010, the content of which is incorporated herein by reference.

FIELD OF THE INVENTION

The disclosure relates to techniques for handling queues in communication networks.

The disclosure was devised with attention paid to its possible application in scheduling real-time flows in uplink packet access cellular networks, such as UMTS High-Speed Uplink Packet Access (HSUPA) and Long Term Evolution (LTE).

DESCRIPTION OF THE RELATED ART

Cellular communication networks, e.g. 3G+ cellular networks, such as HSUPA and LTE (Long Term Evolution of UMTS), are and will be exploited to provide diverse services to users, including real-time services such as voice and video calls, live video streaming, and the like. Real-time services have a bounded end-to-end delay requirement, which, to be properly enforced, leads to the delay at each scheduling hop to be bounded as well. The end-to-end path of each packet includes two end (access) segments and one core network. Core networks are generally overprovisioned and/or make use of standardized QoS-enabling architectures, such as Differentiated Services (DiffServ) and/or MultiProtocol Label Switching-based Traffic Engineering (MPLS-TE), which are well-tuned and normally effective in providing QoS assurance; in that context, access segments plays a key role in enabling reliable real-time services.

Document EP-A-1 885 090 discloses a scheduling procedure to be implemented in MAC for IEEE 802.16d/e (WiMAX) or similar PMP (Point to MultiPoint) telecommunications networks. The procedure involves processing at every radio frame only the connections previously planned to be serviced in that frame and in determining for every serviced connection the most suitable frame for next scheduling. An array of tables is used to store the connection identifiers of the connections to be serviced at the current and next radio frames up to a planned time horizon. At every radio frame, the connections inserted in the current frame tables are processed, the bandwidth is allocated in variable length blocks, and the frame of next servicing is evaluated according to the executed allocation and to the traffic rate parameters. The bandwidth allocation as well as the calculation of the next scheduling frame is performed based on the scheduling type of every service connection. Referring to the uplink scheduler, an estimation is performed of the input queue length of a Terminal Station (TS). This is updated at the reception of every bandwidth request by adding the value of incremental requests or by setting the new value in case of aggregate requests; at the reception of an uplink PDU the TS queue estimate is decremented by the number of bytes actually used, and the queue estimate is reset when a burst completely filled in by padding is received, as a burst not used for traffic nor for management data is interpreted as an aggregate request set to 0.

Additionally, documents such as B. Wang, et al. "Performance of VOIP on HSDPA", Proc. of IEEE VTC Spring '05, June 2005, or M. Andreozzi, et al., "Flexible Scheduling for Real-Time Services in High-Speed Packet Access Cellular Networks", European Wireless 2009, Aalborg (DK) 17-20 May 2009, disclose arrangements where queues are physically placed at the NodeB.

OBJECT AND SUMMARY OF THE INVENTION

The scheduling procedure for telecommunications networks discussed in the foregoing exploits a queue estimation framework to perform uplink scheduling by resorting to a scheduling procedure that processes for every radio frame only the connections previously planned to be serviced in that frame.

The inventors have noted that this inevitably results in an unrefined queue estimation. Also, the inventors have noted that, in the context considered, the possibility to proactively schedule the data to be transmitted without waiting for the uplink signaling request would be a desirable feature.

The object of the invention is thus to provide an improved solution enabling i.a. a more refined queue estimation, with the possibility of proactive scheduling.

According to the present invention, that object is achieved by means of a method having the features set forth in the claims that follow. The invention also relates to a corresponding system (e.g. a node in network) and to corresponding computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

Various embodiments provide a queue estimation procedure that can be exploited as a framework by the uplink scheduler in order to fully exploit the channel conditions experienced by the user.

Various embodiments provide for estimating both the size of the queue and the PDU generation time, and not merely the queue length. In various embodiments, the resulting output is a complete data structure, and not just a number.

Various embodiments are based on reconstructing the queues of each UE at the NodeB, so as to know the size and generation time of their packets and enable a scheduler to use such information. While various embodiments are amenable to all types of traffic, various embodiments are adapted for handling periodic traffic (e.g., VoIP).

Also, while certain embodiments are applicable in HSUPA, various embodiments can be readily applied to other similar access technologies (e.g., LTE) via minor modifications.

Various embodiments consider the uplink access segment of a cellular network, such as e.g. HSUPA. In such a network, scheduling is coordinated by a centralized entity, called NodeB.

User Equipments (UEs, e.g. mobile phones or handheld devices) in a cell send their traffic to the NodeB. At every scheduling period, called Transmission Time Interval (TTI), the NodeB computes Serving Grants (SG) for each UE, which determine—either directly or indirectly—a reference value for the amount of bits that a UE can transmit over its Enhanced Dedicated Channel (E-DCH).

The SGs may be computed according to several performance criteria, e.g. so as to limit the received power at the NodeB, so that the latter is able to decode simultaneous transmissions from several UEs. Data Packets, which may be referred to as Protocol Data Units (PDUs), are buffered in the UE queues length and are transmitted across the radio interface.

Higher layer data packets, which are long, may thus be segmented into a number of PDUs, and padding can be added to fill up the last PDU. The NodeB obtains the backlog state of the UE queues from the Scheduling Information (SI), which are either piggybacked in the PDUs sent by the UE (if any) or in a stand-alone transmission (otherwise), whereby the SI are quantized according to a table, so that, as already noted in the foregoing, reconstructing therefrom the exact backlog state may not be always possible.

In various embodiments a "clever" scheduling solution computes the SG based on the SI reported by the UEs, thus dispensing with the risk of issuing overlength SGs and undesirably wasting resources and reducing the number of UEs that can be served in a TTI. Various embodiments take into account the fact that, when real-time traffic is considered, in addition to knowing how many PDUs are included in each queue and the relevant size, it may also be interesting to know the deadline for transmitting each of them, which cannot be inferred from the SI alone. In various embodiments, using simple computations, a NodeB can reconstruct a sufficiently accurate estimate of the backlog state of UE queues taking the SI as an input, thus providing a reconstructed estimate (which may be termed a Virtual Queue or VQ), which is represented by a list of couples {[lo,hi], d}, where lo, hi are the lower and upper bounds for the number of PDUs in the UE queue generated by time d. Various embodiments may co-operate with any scheduling procedure that takes into account the above information (e.g., those used for real-time scheduling in the downlink direction, where queues are physically placed at the NodeB to be adapted for working with HSUPA via minor modifications).

In various embodiments, the Virtual Queue or VQ procedure does not make assumptions as to the actual traffic generation profile, thus being amenable to any kind of traffic, including non real-time traffic (e.g., HTTP), where a scheduler may harvest a smaller benefit by knowing the size and generation time of all the queued packets.

In so far as real-time traffic is concerned, periodic traffic may play a relevant role. For instance, voice flows have a periodic packet generation behavior: they alternate "on" periods (talkspurts), when they generate fixed-length packets with a constant interarrival time (e.g., 20 s for the AMR codec), and—if they have Voice Activity Detection (VAD), as it normally happens—"off" or silence periods, when they either do not generate packets at all, or generate smaller packets.

Usually, the voice codec is made known at the RNC at the setup of a VoIP flow, for example in the Source Statistic Descriptor field of the RAB Assignment message sent to the RNC (Radio Network Controller) when the PDP Context is activated.

In various embodiments, the RNC can therefore provide the NodeB with the above information, and the latter can be used to identify the flow characteristics (i.e., the flow period and packet size, whether it has VAD or not, whether it generates packets during off periods, etc.). The VQ procedure can thus be refined to better match the flow characteristics, resulting in a reduced error in the reconstructed VQ.

Moreover, in the presence of periodic traffic, the possibility exists of predicting the arrival of PDUs in the near future (i.e., the next 1-2 TTIs); this may be of interest since issuing SGs reactively, i.e. based on the SI reported by the UEs, undergoes a non negligible signaling delay equal to (at least) 2 TTIs, i.e. 20 ms in a 10 ms TTI deployment.

In various embodiments, such signaling delay can be avoided by predicting the backlog status of the UE queue at the time a possible SG will actually be used, i.e. in the subsequent TTI. In that way, SG can be issued proactively, i.e. based on the predicted status of the UE queue, before the SI is actually conveyed to the NodeB. This is achieved by computing the SG on a projection of the state of the VQ at the time when the SG will actually be exploited by the related UE.

In various embodiments, proactive scheduling can coexist with standard (reactive) scheduling of non-periodic or poorly predictable uplink flows, and can be turned on and off at will on the same flow, depending on whether a reliable estimate of the packet generation instants is available or not.

In various embodiments, Virtual Queue techniques can also be applied to other technologies. In fact, the Long Term Evolution of UMTS (LTE) is another potential area of application.

In LTE, scheduling of uplink resources is done by eNodeB. The latter assigns certain time/frequency resources to the UEs and informs UEs about the transmission formats to use. As in HSUPA, scheduling decisions may be based on QoS parameters, UE buffer status, uplink channel quality measurements. As in HSPA, the UE buffer status reported to the eNodeB is a coarsened version of the real UE buffer occupancy, and a quantization table, similar to the one employed in HSPA, is used for encoding the UE buffers occupancies.

Moreover in LTE, like in HSPA, there is no way to acquire direct knowledge of uplink traffic deadlines. Therefore, in various embodiments the possibility of reconstructing the UEs buffers status at the NodeB level in HSPA, can be easily ported, with minor adjustments, into the LTE eNodeB MAC layer, in order to enable deadline-based scheduler to be executed also in the uplink side of the LTE architecture.

In various embodiments, virtual queueing can be applied to any technology that satisfies the following requirements:

packets are segmented into a number of fixed-length PDUs, whose length is known at both the sender and the receiver. That length need not be the same for all senders;

the status of uplink buffers is reported by conveying to the NodeB either an exact or an approximate buffer length, measured in number of PDUs. Reporting can be either periodical or non periodical;

the receiver (of buffer status reports) decides scheduling grants for the senders.

In various embodiments, an improved estimate of the queue length may be obtained by periodically increasing the queue length by a fixed amount and subtracting the number of detected information units transmitted from the second point (e.g. the User Equipment or UE) to the first point (e.g. the base station), in case the arrival process for the information units at the second point is known to be periodic; the estimated queue length is compared to the quantized queue length information reported by the second point (e.g. the UE), and any mismatch in the above comparison is used to infer the onset and the termination of periodic packet generation at the second point.

BRIEF DESCRIPTION OF THE ANNEXED REPRESENTATIONS

The invention will now be described, by way of example only, with reference to the enclosed representations, wherein.

DETAILED DESCRIPTION OF EMBODIMENTS

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

By way of introduction, some basic concepts of HSUPA technology will be summarized, with emphasis placed on the SI reporting and SG signaling mechanisms; the unscheduled mechanism for HSUPA, which can be used in conjunction with voice traffic, will then be recapitulated together with voice codecs and their characteristics.

As regards HSUPA, the UMTS radio access network (UT-RAN) includes three major network elements: the Radio Network Controller (RNC), the Base Station (NodeB) and the User Equipment (UE). A RNC controls one or more NodeBs, the latter being in charge of a single cell where UEs roam.

In HSUPA the NodeB coordinates scheduling decisions using TTIs of 2 or 10 ms. The Protocol Data Units or PDUs are physically stored at the UEs. However, the NodeB obtains the backlog state of the UE queues from the Scheduling Information (SI), which includes the total backlog on the UE and the percentage of the latter accounted to the highest priority flow (i.e., the one which will be selected by the internal UE scheduler). Both are quantized, using five and four bit indexes respectively, according to two non-linear tables (see the $3^{rd}$ Generation Partnership Project website already captioned in the foregoing) so that reconstructing the exact backlog state may not be possible. The UE always reports an overestimated backlog to the NodeB.

The NodeB allocates data transmission power to the various UEs by assigning them scheduling grants (SGs). Depending on the received SG, the UE selects the appropriate coding, which also determines the employed TBS. The mapping between SGs and TBSs (Transport Block Sizes or Sets) is pre-configured in the E-DCH Transport Format Combination (ETFC) table, which is known to both the NodeB and the UEs. A null SG, called the zero grant, prevents the UE from transmitting any data.

In considering SI reporting and SG signaling, one may first focus on a generic User Equipment or UE, say i. One may assume that i has one real-time flow, which is internally scheduled at the highest priority. The QoS class of the flow is known to the NodeB from the setup negotiation. Some other information, hereinafter called flow information, is normally available at least at the RNC (which can, in turn, communicate them to the NodeB). For exemplary purposes, this information may be assumed to include the voice codec employed, one out of a finite choice of known possibilities (which is what normally happens).

A standard SI quantization table (Table 1) is reported below, both in bytes (left) and in 40-byte PDUs (right). In Table 1 herein, those SI values which cannot be reported in this case are shown in grey.

TABLE 1

| SI | Bytes |
|---|---|
| 0 | 0 |
| 1 | 10 |
| 2 | 14 |
| 3 | 18 |
| 4 | 24 |
| 5 | 32 |
| 6 | 42 |
| 7 | 55 |
| 8 | 73 |
| 9 | 97 |
| 10 | 129 |
| 11 | 171 |
| 12 | 228 |
| 13 | 302 |
| 14 | 401 |
| 15 | 533 |
| 16 | 708 |
| 17 | 940 |
| 18 | 1248 |
| 19 | 1658 |
| 20 | 2202 |
| 21 | 2925 |
| 22 | 3884 |
| 23 | 5160 |
| 24 | 6853 |
| 25 | 9103 |
| 26 | 12092 |
| 27 | 16062 |
| 28 | 21335 |
| 29 | 28339 |
| 30 | 37642 |
| 31 | 50000 |

| SI | PDUs |
|---|---|
| 0 | 0 |
| 1 | 0 |
| 2 | 0 |
| 3 | 0 |
| 4 | 0 |
| 5 | 0 |
| 6 | 1 |
| 7 | 1 |
| 8 | 1 |
| 9 | 2 |
| 10 | 3 |
| 11 | 4 |
| 12 | 5 |
| 13 | 7 |
| 14 | 10 |
| 15 | 13 |
| 16 | 17 |
| 17 | 23 |
| 18 | 31 |
| 19 | 41 |
| 20 | 55 |
| 21 | 73 |
| 22 | 97 |
| 23 | 129 |
| 24 | 171 |
| 25 | 227 |
| 26 | 302 |

TABLE 1-continued

| | |
|---|---|
| 27 | 401 |
| 28 | 533 |
| 29 | 708 |
| 30 | 941 |
| 31 | 1250 |

The table reports in its left hand side a dimension in bytes, whereas the queues actually contain a number of fixed-length PDUs, whose length is selected by the NodeB. The PDU length can be set arbitrarily. A common value is 40 bytes, which is such that a voice packet is entirely contained into a PDU.

The number of 40-byte PDUs associated to each SI value is shown on the right side of Table 1. For instance, the UE reports a value of 18 if the queue is buffering 24 to 31 PDUs. For a given PDU size, the quantization table is divided in two zones: a non ambiguous zone, consisting in the set of SI that allows one to infer an exact backlog at the UE (i.e., $0 \leq SI \leq 12$ for 40-byte PDUs) and an ambiguous one, where the quantization intervals are larger than the PDU size. Furthermore, it will be appreciated that—in the non ambiguous region—not all the SI values are actually possible. The width of the ambiguous region depends on the PDU size. The larger the PDU size, the smaller the ambiguous region, and, within the latter, the width of each quantization interval.

In the following, whenever referring to SI quantization, the PDUs will be assumed to be 40 bytes long. This may be regarded as a "pejorative" assumption in terms of quantization. However, various embodiments do not rely on the PDU size, although their performance and effectiveness—may be related thereto.

A UE application generates packets, so that, at some time instants, a number of PDUs is inserted in the (FIFO) UE queue. When the UE receives a SG from the NodeB, it transmits one MAC-E PDU, which includes zero or more PDUs and/or SI, in a single TTI. Those PDUs may belong to different packets, as original packets are reassembled at the NodeB. This means that the scheduling module in the latter may be made aware of packet boundaries when it receives a set of PDUs. However, no such assumption is made here.

Packets queued at the UE can be removed either by scheduling decisions taken at the NodeB, or dropped by the UE after a known dropping timeout. Without loss of generality, one may assume that one packet is generated in a TTI. In fact, the UE is not required to transmit packets atomically, and it can mix PDU of several packets (however maintaining the FIFO ordering) in the same transmission. Furthermore, it may not be possible to pin down events with a smaller resolution than the TTI, from a real-time scheduling point of view packets of a flow generated in the same TTI would have the same deadline nonetheless.

In the following, purely for ease of exposition, times will be normalized to the TTI length, so that the sequence of TTIs is a sequence of natural numbers. The SI issued at a given TTI T at the UE reports the state of its queue up to T. However, this SI arrives at the NodeB at time T+1. Assuming that the NodeB is able to compute a scheduling decision in zero time, the NodeB might be able to keep into account that SI when issuing the subsequent SG. The latter in turn arrives at the UE at time T+2. Therefore, in the very best case, the signaling delay will equal 2 TTI.

Figure 1:
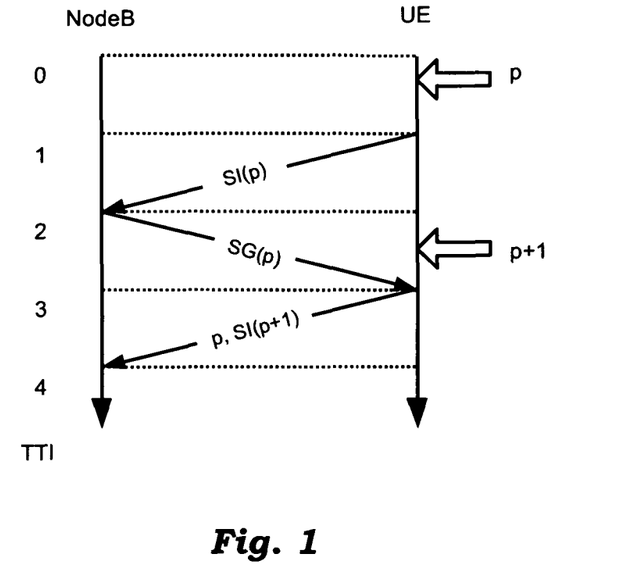
FIG. 1 is representative of SI and SG timing in an embodiment.

FIG. 1 herein is exemplary of SI and SG timing in communication between a NodeB and a User Equipment or UE. In a 10 ms TTI deployment, such a signaling delay is indeed attainable, since the SG is actually 2 ms long, and they are repeated five times in the 10 ms period. It is thus foreseeable that the NodeB might take, e.g., 2 ms for computing the SGs for the UEs in the cell, leave the first 2 ms instance blank, and actually repeat the correct SG four times. The UEs would therefore be able to decode the correct SG simply by skipping the first instance. In a 2 ms TTI deployment, instead, there seems to be no other way than wasting at least another TTI for allowing the NodeB to make scheduling decisions, which brings the signaling delay to 3 TTI.

Every item of information received at the NodeB at T will inevitably refer to quantities generated before T−1. In the following the NodeB will be taken as a reference, since decisions are taken by the latter. Therefore, reference will be had to—say—SI at time T to define SI received at that time (hence generated at time T−1 at the UE). Finally, for the same reason, a packet will have a minimum delay lying between one and two TTIs, depending on its arrival time with respect to the TTI boundary.

In HSUPA, non-scheduled transmissions are allowed by standards. Specifically 3GPP TS 25.309 V6.6.0 (2006-03), Chapter 10 indicates that when non-scheduled transmission is configured by the SRNC, the UE is allowed to send E-DCH data at any time, up to a configured number of bits, without receiving any scheduling command from the Node B. Thus, signalling overhead and scheduling delay are minimized.

This means that a share of the resources is reserved at every TTI for such kind of transmissions. These resources are not handled by the scheduler. The LTE system allows a similar mechanism, with enhanced flexibility. The RRC (Radio Resource Control) may configure some H-ARQ processes to be reserved for periodic resource assignment, in both the downlink and the uplink direction. This is called semi-persistent scheduling. By using the latter, some OFDMA resources (and, accordingly, data resources), are pre-reserved. In LTE, the non-scheduled mode can be used to serve a MAC-d flow of a UE. In this case, the latter is served periodically (for up to a configurable maximum number of periods), and is given a fixed grant on a given set of TTIs within a period.

In both HSUPA and LTE the SI is not taken into account for the flow for non-scheduled services. Furthermore, signaling delay and overhead are reduced, since SG need not be transmitted. Moreover, in HSUPA (where a non-scheduled UE has an implicit SG at every TTI), near-zero uplink latency is also achievable. However, this comes with a drastic reduction in efficiency, as these services completely bypass the NodeB scheduler (hence their name). Broadly speaking, non-scheduled transmissions subtract a number of resources from the control of the scheduler. Under this regime, a non-scheduled flow can transmit up to a pre-defined number of bits, whether its queue is empty or not, whether the related PDUs are urgent or not, whether the channel conditions for the UE are optimal or largely suboptimal. Furthermore, queue length and delays are not taken into account, as SI are not considered. This makes such a mechanism inefficient when used on a large scale (i.e., for many users simultaneously), or for mobile users with varying channels. In HSUPA, additional mechanisms would also be required to keep the intra-cell interference generated by non-scheduled users under control.

On the other hand, VQ (in all its versions, included those specialized for CBR (Constant Bit Rate) service) is meant to work at the scheduling level, enabling a scheduler to know the current (and, in case of CBR sources, predict the future) state of a UE queue, specifically how many packets are in there and (most of all) when they were queued. This allows a scheduler (which is an external element in this framework) to use the above information for whatever suitable purpose. For instance, it could set up a purely deadline-based service (which cannot be done, for instance, using semi-persistent scheduling), or a hybrid, semi-opportunistic scheduling, where packet deadlines and channel conditions are combined to form scheduling and resource allocation criteria. While, for instance, efficient solutions which capitalize on statistical multiplexing among different connections, adaptive channel exploitation, etc., can be designed using a VQ framework, this cannot be achieved by using a non-scheduled mode.

Turning now to voice codecs, VoIP applications represent an important class of real-time traffic in today's HSPA systems. As already anticipated, a specialized VQ procedure will be presented for periodic traffic.

The traffic profiles of VoIP applications can be classified into four categories:

CBR (Constant Bit Rate): applications that generate constant-size packets at constant intervals;

CBR on/off: these applications have Voice Activity Detection (VAD). They generate constant size packets at constant intervals during talkspurts, and they do not generate information during silence periods;

Quasi-CBR: constant packet generation interval (during both talkspurts and silence periods), different packet size for talkspurts and silence periods;

VBR (Variable Bit Rate): packets of variable lengths generated at fixed intervals.

This exemplary disclosure describes specialized VQ procedures for the first two categories; extensions for the third one are straightforward, especially if the scenario is limited to a communication where the Quasi-CBR has constant size packets at constant intervals, behaving basically like a CBR on/off.

Some common characteristics for all the voice codecs can be abstracted as follows: packet generation periods are normally larger than the TTI (whichever the version, 2 ms or 10 ms). For instance, voice streams using the AMR codec are CBR (with on/off alternation due to Voice Activity Detection), with frame generation periods of 20 ms (i.e. 2 or 10 TTI, depending on the HSUPA version). The periods considered are not necessarily integer multiples of a TTI. Furthermore, for VAD-enabled codecs, single "on" and "off" periods are normally much larger than the inter packet generation time (and, consequently, of the TTI). The average length of these periods is in the order of 100-1000 TTIs, whatever the voice model adopted and the TTI length.

Also, quasi-CBR sources may appear to the scheduler as CBR sources, if the length of the packets during talkspurts and silence periods amounts to the same number of PDUs. For instance, the GSM AMR codec generates 32 bytes of payload during talkspurts, and either 0 or 5 bytes of payload during silence periods. If the PDU length is above 72 bytes, then the SI reports just one PDU in all cases.

Figure 2:
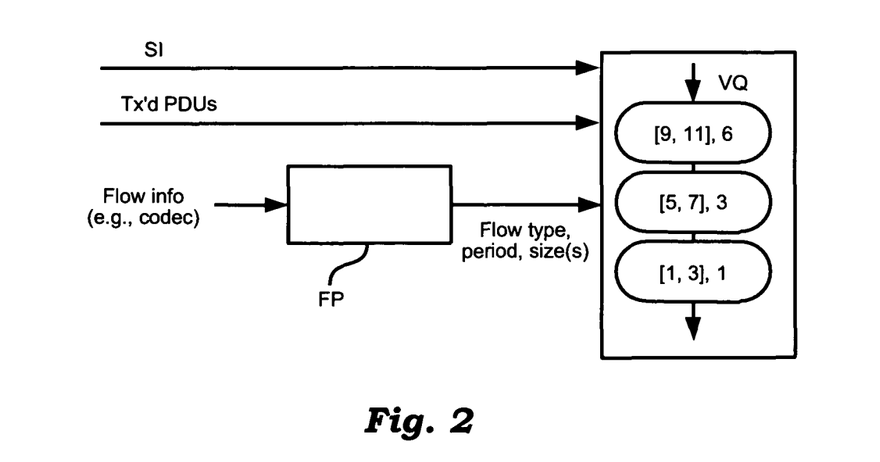
FIG. 2 is a block diagram illustrative of the scheduling framework in an embodiment.

An exemplary scheduling framework is shown in FIG. 2. The Virtual Queuing block collects the sequence of SI and transmitted PDUs from the UE, and uses this information to reconstruct the state of the UE queue in the most accurate possible way, using affordable computations. A basic procedure, which does not make any assumption on the traffic profile, will be described in the following. In some cases, we might know more about the flow, and exploit this knowledge to improve the VQ estimate. A "flow profile" may be defined as a set of information items such as: whether the traffic is periodic, and whether the generated packets have a constant length. The above information can be collected at flow setup, through means that are known to the person skilled in the art and do not need not be described here. One may assume that the NodeB is configured with a table which associates codecs with the following information: i) a flow type (e.g., CBR, or CBR on/off, etc.), ii) a flow period, and iii) a packet length. If a flow is known to be CBR or CBR on/off, this information can be used both to specialize the VQ procedure and to enable proactive SG assignment. As for the first issue, knowing its packet length and period allows one to overcome the uncertainties in the VQ estimate that arise due to the SI quantization. Furthermore, as it allows one to predict the size and generation instant of packets, it enables the NodeB to assign suitably large SGs proactively to periodic flows.

FIG. 2 is representative of an exemplary scheduling framework including a Virtual Queuing arrangement VQ having SI plus TX'd PDUs as inputs together with information as to flow type, period, size(s), and so on developed by a flow profile module FP starting from flow information as provided e.g. by a codec.

The following description relates to the basic Virtual Queueing (VQ) procedure and how to populate and manage the VQ observing the sequence of SI reported by the UE and the sequence of PDUs transmitted by the UE.

Various embodiments pursue the goal of enabling the NodeB to reconstruct the exact backlog state on the UE, which may not be always possible due to the quantized nature of the SI. The estimation process depends on the PDU length, and, in general, the shorter the PDU size, the more difficult the accurate estimations of their number (see Table 1).

Although an exact packet length for every generated packet cannot be inferred from the SI in general, by considering the sequence of reported SI and transmitted PDUs the accuracy of the VQ estimate can be increased, thus considerably reducing the impact of the SI quantization.

A general procedure will be considered first, while subsequently showing a possible refinement step for the case when flow profile information is available.

A VQ is a FIFO queue of items {[lo, hi], d}, where d is an estimated packet generation time, and lo, hi are the lower and upper bounds for the overall VQ backlog including all packets generated until time d. How those time instants d are computed will be described in the following.

FIG. 2 illustrates a possible "snapshot" of a VQ: 1 to 3 PDUs that are still sitting in the UE queue were generated at time 1, whereas 5 to 7 PDU were generated up to time 3 (which implies that 5−3=2 to 7−1=6 PDUs were generated at time 3) and so on. While one can easily infer lower and upper bounds for each packet in the VQ from the above information, one may prefer to store the queue length at time t in the VQ, since the above information is more precise than the length of single packets. In fact, for the latter the uncertainty in the estimation of the queue length for two consecutive packets is summed up. This means that one may estimate the length of single packets from the cumulative lengths if need be, while the converse may not be true without allowing for further errors.

Furthermore, the length associated to the head of the VQ still describes the head-of-line packet, which in fact enables deadline-based scheduling.

Let $S_i$, $D_i$, $q_i$ be the SI, the number of transmitted PDUs and the queue length at time i, and let $L(\bullet),H(\bullet)$ be the functions that report the lower and upper bounds on the UE queue length from the SI given as a parameter, as specified in the quantization table.

For instance, with reference to Table 1, one may have $L(15)=11, H(15)=13$. According to the standard, when a UE sends both PDUs and SI, the backlog reported by the latter does not take into account the PDUs just transmitted.

At a high level, the VQ estimation works as follows.

Every time a set of k PDUs is transmitted by the UE to the NodeB, the number k is subtracted from the upper and lower bounds of every entry in the VQ, and when the upper bound of the head-of-line entry reaches zero the latter is removed from the front.

Every time a new SI arrives at the NodeB, the new information is used to either improve the length estimate for the tail of the VQ, or to detect the generation of a new packet at the UE.

When a new packet generation is detected at time t, a new entry $\{[L(S_t),H(S_t)],t\}$ is added to the tail of the VQ.

In order to explain the procedure in detail, one may start with describing what happens with an initially empty queue, assuming that one packet is generated at time 0. The general case will then be described.

At every subsequent time instant i, the following relationships hold:

$$\forall i \geq 0, L(S_i) \leq q_i \leq H(S_i)$$

No other packet is assumed to be generated at the UE after time 0 for a while, i being a generic instant.

Then, for any time j between 0 and i:

$$\forall i \geq 0, \forall j: 0 \leq j \leq i, q_i = q_j - \sum_{x=j+1}^{i} D_x. \tag{1}$$

This means that the queue is not growing. In fact, some PDU might be transmitted from the UE. If this happens, then the SI at time j will reflect the new state of the queue, which will generally be smaller than it was at time 0 (assuming that no packets are generated after time 0).

From (1), the following can be derived:

$$\forall i \geq 0, \tag{2}$$

$$Q_i^L = \max_{0 \leq j \leq i} \left\{ L(S_j) - \sum_{x=j+1}^{i} D_x \right\} \leq q_i \leq \min_{0 \leq j \leq i} \left\{ H(S_j) - \sum_{x=j+1}^{i} D_x \right\} = Q_i^H$$

$Q_i^L, Q_i^H$ are the most accurate bounds on the length of the queue available at time i given the above information. Now, in the absence of a new packet arrival, $Q_i^L, Q_i^H$ are increasing and decreasing respectively, thus narrowing down the uncertainty for $q_i$.

Therefore, in order to provide the scheduler with a consistent view at every TTI, both $Q_i^L, Q_i^H$ should be recomputed and the corresponding VQ entry updated. However, if another packet is generated at the UE at some time k, then $Q_i^L > Q_i^H$ might possibly take place for some h≥k, because L(•) may increase.

A simple example is the following.

Assume that at time 0 a 20-PDU packet arrives. Then we have $S_0=17$, $L(S_0)=18$, $H(S_0)=23$. Thus, an entry is inserted in the VQ, $\{[18,23],0\}$. At time 1, no PDUs are transmitted and $S_1=17$. At time 2, the UE transmits four PDUs, and sends $S_2=17$ again. According to (2):

$$Q_2^L = \max\{L(S_0)-4, L(S_1)-4, L(S_2)\} \leq q_2 \leq \min\{H(S_0)-4, H(S_1)-4, H(S_2)\} = Q_2^H$$

which, after few manipulations, becomes $Q_2^L=18$, $Q_2^H=19$.

This means that the number of PDUs in the queue at time 0 was at least $q_0 \geq 18+4=22$, and $q_0 \leq 23$. Note that the initial uncertainty on the number of PDU included was 23−18=5 PDUs at time 0, and it is now 19−18=1 PDU, i.e. it narrows down with time.

Suppose now that, at time 3, two more PDUs are received at the NodeB, and the UE still reports $S_3=17$. Clearly, this implies that another packet must have arrived: if it had not, then the UE queue would be between 16 and 17 PDUs, and the reported SI would be $S_3=16$.

If (2) is instantiated again at time 3, one gets:

$$Q_3^L = \max\{L(S_0)-6, L(S_1)-6, L(S_2)-2, L(S_3)\} = \max\{14, 14, 16, 18\} = 18$$

$$Q_3^H = \min\{H(S_0)-6, H(S_1)-6, H(S_2)-2, H(S_3)\} = \min\{17, 17, 19, 23\} = 17$$

In this case, the inconsistency is revealed by the fact that $Q_3^L > Q_3^H$. When this happens, the most accurate estimate for the length of the first entry in the VQ is $[Q_{h-1}^L, Q_{h-1}^H]$, and a new entry $\{[L(S_h),H(S_h)],h\}$ is added to the tail of the VQ. From then on, the estimate for the previous entry (i.e., the last-but-one) is frozen, and every subsequent information can only be used to improve the last entry in the VQ.

At TTI h, the computation of $Q_i^L, Q_i^H$ is restarted, i.e., we rewrite (2) substituting the index of the most recent packet arrival for 0:

$$\forall i \geq h, \tag{3}$$

$$Q_i^L = \max_{h \leq j \leq i} \left\{ L(S_j) - \sum_{x=j+1}^{i} D_x \right\} \leq q_i \leq \min_{h \leq j \leq i} \left\{ H(S_j) - \sum_{x=j+1}^{i} D_x \right\} = Q_i^H$$

Note that $Q_i^L, Q_i^H$ can be computed in constant time, as (3) boils down to:

$$Q_i^L = \max\{L(S_i), Q_{i-1}^L - D_i\}, \quad Q_i^H = \min\{H(S_i), Q_{i-1}^H - D_i\} \tag{4}$$

While it may not always be possible to identify the exact TTI when the new packet has been generated (unless additional information on the packet generation process is available), one may decide to acknowledge that a packet is generated when the information provided by (4) becomes inconsistent.

Assume now that the VQ includes N entries $\{[m^i,n^i],t^i\}$ (a superscript is used for the entries in the VQ and a subscript for time instants): every time a set of k PDUs are transmitted from the UE to the NodeB, the following actions take place:

$$\forall i, 1 \leq i \leq N-1, m^i = \max\{0, m^i-k\}, n^i = n^i - k \tag{5}$$

Furthermore, if $n^1 \leq 0$ the head-of-line entry has to be removed. This implies that one may be considering more PDUs than necessary as being generated at a given time instant, which may be avoided by using additional information. If, e.g., the NodeB sees packet boundaries and one can be reasonably sure that only one packet is generated at a TTI, this last part of the procedure can be refined according to known methods.

The last entry in the VQ (i.e., the $N^{th}$), is instead updated through (3). If updating each entry of the VQ at every transmission is too costly, a tradeoff between accuracy and speed can be achieved as follows:

when PDUs are transmitted by the UE, (4) is computed for the last entry and the transmitted PDUs are subtracted from the head-of-line entry alone;

each VQ entry is augmented with a counter $q^x$. The latter is set to $n^{x-1}$, i.e. the upper bound on the estimate of the previous entry, when the $x^{th}$ entry is frozen;

once the upper bound for the head-of-line entry becomes negative, the latter is removed, and for the new head-of-line entry we subtract $q^x$ from both the lower and upper bounds, as well as any reminder from the previous transmission.

This makes it possible to update the VQ in constant time, without worsening the length estimate of both the head-of-line packet and the whole queue, which are normally the most important information taken into account at the scheduler. For instance, the HY-CART scheduler needs only the first one in order to make its decisions. However, one may not be able to correctly assess the length of the queue up to the $x^{th}$ packet, $1<x<N$, at least not without tolerating $\Theta(N)$ operations.

As already anticipated, in various embodiments, in case the arrival process for the information units at the UE is known to be periodic, an improved estimate of the queue length may be obtained by periodically increasing the queue length by a fixed amount and subtracting the number of detected information units transmitted from the UE to the base station. The estimated queue length may be compared to the quantized queue length information reported by the UE, and any mismatch in the above comparison is used to infer the onset and the termination of periodic packet generation at the UE.

In the presence of flow profile information, the VQ procedure described in the foregoing can however be employed with any kind of traffic, as it does not rely on additional information on the flow profile (e.g., whether the traffic is periodic or not). However, in the presence of flow profile information, the VQ procedure can be specialized.

The following is a description of how flow profile information (whether provided as an input or inferred from the VQ procedure) can be used to specialize the VQ procedure, and to design a specialized VQ procedure version for CBR on/off flows. CBR flows can be considered as a sub-case of CBR on/off flows, with an arbitrarily long "on" period. Moreover, the quasi-CBR case can be readily derived through straightforward modifications starting from the CBR on/off case.

For CBR on/off, the size of a packet is constant, on and off periods are one order of magnitude larger than the packet generation period. Under these hypotheses, the VQ procedure can be specialized as follows.

Assume for the sake of discussion that the packet period is equal to x TTI, where x is an integer (this hypothesis is made solely for the sake of simplicity, and is in no way mandatory). Then:

within a talkspurt, every x TTI insert a constant length packet in the VQ;

whenever the SI, computed on the VQ, is larger than the reported SI, assume that a silence period has begun, stop generating packets and remove the exceeding entries from the tail of the VQ.

The TTI when a packet is generated, from which all the packet generation instants can be estimated, can be detected, for instance, if one receives two consecutive SI which reveal a packet generation. For instance, assuming a 2 TTI period for 1-PDU packets, if $SI(i)=4$, $SI(i+1)=5$, then packets are generated at time $i=5+2\cdot k$, $k\geq 0$.

Figure 3:
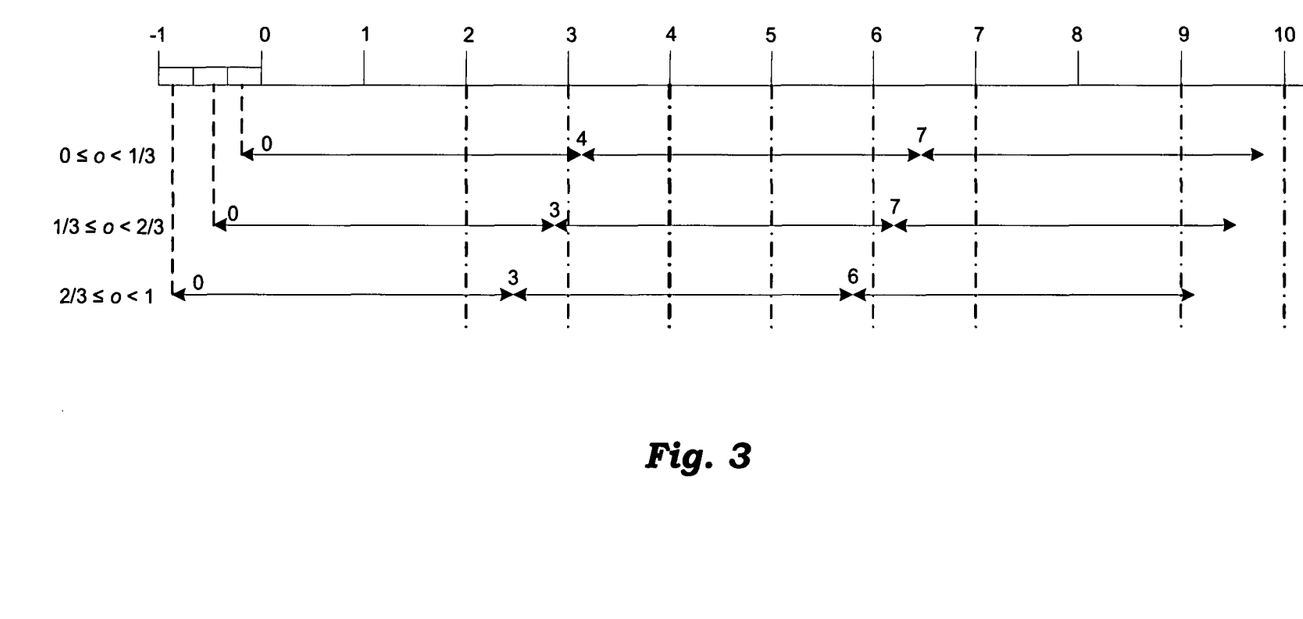
FIG. 3 is illustrative of possible sequences of packets depending on the initial offset in an embodiment.

If, as it happens with some voice codecs, packets have a non-integer period (e.g., 33.3 ms, i.e. 10/3 of a 10 ms TTI), then the computations—although conceptually simple—may be slightly more involved, but otherwise practicable with conventional means. In fact, in this case, knowing the period and the TTI of the first packet of a talkspurt may not be sufficient to determine the TTIs when packets are generated: the offset with respect to the TTI boundary, i.e. whether $0\leq o<\frac{1}{3}$, $\frac{1}{3}\leq o<\frac{2}{3}$, $\frac{2}{3}\leq o<1$ in this case, can be determined as schematically shown in FIG. 3, which shows illustrative sequences of packets depending on the initial offset, with an exemplary period equal to 10/3 TTI.

A condition used to detect the generation of a packet may be an increase in the reported SI. This means that one may implicitly assume that, during a silence period, the UE queue can be drained sufficiently, so that there is no ambiguity in the detection of the first packet. Such assumptions are reasonable, since the duration of a silence period is considerably larger than the packet period and the ambiguous region starts when there are several (e.g., more than 5) packets in the queue. Similarly, the onset of a silence period is detected through mismatch between the SI and the VQ length. Again, this condition might be detected with some delay if the UE queue is in the ambiguous region when this happens. However, late detection of a silence period is not particularly harmful, since the VQ is rapidly reset to the correct length, and virtual packets entered by mistake have little, if any, chance of being seen by the scheduler.

As already shown previously, the signaling delay associated to SI reporting and SG scheduling amounts to at least two TTIs, assuming that at time $T_{k+1}$ the NodeB can issue a SG which takes into account the SI sent by the UE at time $T_k$. The latter is unavoidable if reactive SG scheduling is used, even if an UE queue is always emptied right after each non-zero SI report. As the TTI duration in HSUPA can be as high as 10 ms, 20 ms of added delay in the uplink direction are not negligible, especially with voice applications.

Figure 4:
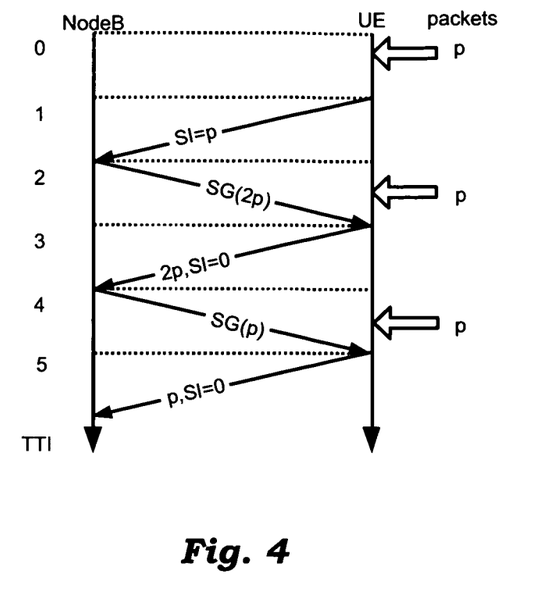
FIG. 4 is illustrative of a High-level example of proactive scheduling in an embodiment.

However, such a delay can be removed by employing a proactive SG assignment scheme, by exploiting the VQ procedure and the prediction of the time instants at which packets are generated. In fact, if the packet length and generation instants are known, SG can be scheduled based on the presumed backlog state of the UE at the time when the SG will actually be used. For instance, if the NodeB knows that voice packets are generated each 20 ms (i.e., every other TTI) starting from time 0, it can schedule a SG large enough to hold two packets at time 2, and periodically schedule another SG for one packet, as shown in FIG. 4, which is representative of a high level example of proactive scheduling.

It will be appreciated that the figure slightly abuses the notation for the sake of conciseness, assuming that SG(2p) means an SG large enough to transmit two packets of length p. Furthermore, non interesting quantities (e.g., the SI generated at the UE at time 2) are not shown for ease of reading.

In this way the delay of each packet (under ideal channel conditions) is reduced to 1.5 TTI on average, which is actually the lower bound. The VQ procedure can then be run at $T_k$, by predicting the SI that the UE is going to send at $T_{k+1}$ (when in fact it will use the grant that the NodeB is computing), to assign SG based on the estimated state of the VQ at time $T_{k+1}$.

In this example, assuming a CBR on/off flow, proactive scheduling would yield a benefit in terms of delay for each packet in a talkspurt except the first one. In fact, the beginning of a talkspurt can only be detected by looking at the SI (i.e., reactively), so that the first packet actually has a higher delay (3.5 TTI on average) than the rest. Likewise, since the onset of a silence period can only be detected reactively, i.e. through a mismatch between the VQ and the SI, an SG will be wasted at the end of each talkspurt (unless the UE has lower priority traffic to send). Given that the average number of voice packets in a talkspurt is rather large, and that the SG required for servicing a voice packet is normally small, this results in a negligible waste of cell capacity. Obviously, channel conditions may be taken into account for scheduling decisions. In that case, being proactive increases by two (i.e., the number of TTIs in the signaling delay) the number of scheduling opportunities for a packet, thus possibly allowing for a better exploitation of the variable channel characteristics.

Proactive scheduling may be enforced once the packet generation pattern of the flow is known. For that reason, each flow may be associated to a proactive Boolean variable, which is initially false and is set to true whenever the NodeB has achieved enough information on the packet generation pattern. It may then become false again if packet generation becomes too jittery (possibly because of operating system overhead at the sending application or due to clock skews) or unknown (e.g., at the beginning of a silence period for a CBR on/off voice flow). Thus, proactive and reactive grant scheduling can be mixed for the various flows at a given time.

Figure 5:
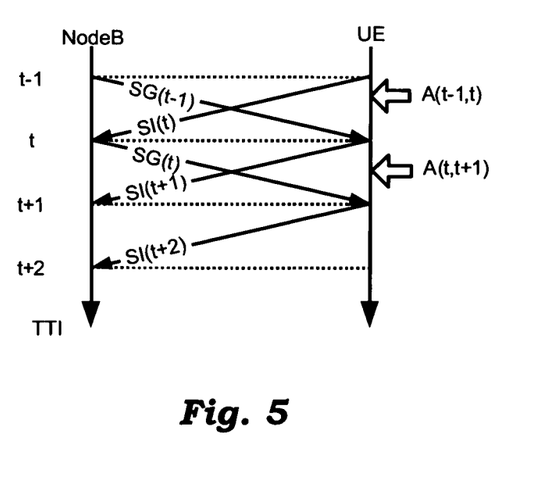
FIG. 5 represents certain possible relevant quantities in proactive scheduling in an embodiment.

This point can be investigated more in detail with reference of FIG. 5, which is representative of relevant quantities in proactive scheduling again between a UE and a NodeB.

One may assume that scheduling decision is made at time t. At that time, one has SI(t), which was generated at time t−1 at the UE. On the other hand, the SG being computed will be used at time t+1 at the UE.

Therefore, one takes into account:
the packets generated between t−1 and t+1 at the UE;
the PDUs transmitted by the UE at time t, according to the SG that was sent at time t−1.

Therefore, at time t the NodeB will:
update the VQ including SI(t)
compute the predicted state of VQ at time $t^-$, $VQ|_t^-$ (which would be known at t+1), by predicting the arrivals in [t−1,t) according to the flow profile
starting from $VQ|_t^-$, compute the amount of PDUs that the UE will transmit at time t as the minimum between those allowed by the SG issued at time t−1 and those in $VQ|_t^-$. Those PDUs will not need be reported any more once they have been sent to the H-ARQ process for transmission (even if they need retransmitting). This allows one to compute $VQ|_t^+$
compute the predicted state of VQ at time $(t+1)^-$, $VQ|_{(t+1)}^-$ (which would be known at t+2), by predicting the arrivals in (t, t+1) according to the flow profile.

It may happen that, at some time, the UE is not eligible for transmitting new PDUs, since a retransmitting H-ARQ process has its turn. In that case, the NodeB will simply skips the UE for allocating grants.

Proactive scheduling can be employed with CBR and CBR on/off flows, provided that the correct VQ procedure is used for each flow.

Various embodiments enable a scheduler to perform scheduling of real-time uplink flows by reconstructing, through a Virtual Queueing technique, the status of the uplink buffers. The outcome of such a technique is that the scheduler possesses a virtualized version of the uplink flow buffer, where virtual packets are associated to their estimated size and generation time.

Various embodiments will thus enable a scheduler to make real-time decisions (e.g., schedule PDUs by deadline), which could not be possible otherwise.

Various embodiments of Virtual Queueing techniques considered herein can be applied to any system (e.g., cellular ones) where, e.g.:
packets are segmented into a number of fixed-length PDUs, whose length is known at both the sender and the receiver, such a length not having to be the same for all senders;
the status of uplink buffers is reported under the form of a number of PDUs, in either a coarsened and an exact version, either periodically or non periodically;
the receiver (of buffer status reports) decides scheduling grants for the senders;
both the High Speed Uplink Packet Access (HSUPA) and the Long Term Evolution (LTE) of the UMTS verify all three conditions.

Various embodiments concern a standard Virtual Queueing technique, which does not make any assumptions on the packet generation process, thus being suitable for any kind of real-time traffic (whether CBR or not).

Various embodiments concern a specialized VQ version for CBR (or CBR on/off, or Quasi-CBR) traffic, which capitalizes on knowing the packet size and period of a connection.

In the latter case, a proactive version of the scheduling process can be adopted at the scheduler. In this, the scheduler computes its scheduling grants based not only on the (state) information arrived at previous reporting intervals, but on the predicted state of the queue at the moment the grant will be actually used.

A main benefit of using VQ techniques lies in that a number of schedulers which could not be used in an uplink context (i.e., those that need to know the packet arrival time in order to make a decision) can now be employed in conjunction with VQ.

This disclosure demonstrates the effectiveness of various embodiments of VQ used in conjunction with e.g. a HY-CART scheduler, originally designed for HSDPA connections.

Performance evaluations performed by the applicants show significant benefits in using the three techniques.

Without prejudice to the underlying principles of the invention, the details and the embodiments may vary, even appreciably, with respect to what has been described by way of example only, without departing from the scope of the invention as defined by the annexed claims.

The invention claimed is:

1. A method of estimating, at a first point of a communication network, the length of a queue of information units to be transmitted to said first point from a second point in said network, comprising receiving at said first point from said second point, quantized queue length information, said quantized queue length information being indicative of a lower bound and an upper bound for said queue length, comprising:
detecting at said first point, transmission of information units from said second point to said first point; and
producing an improved estimate of said queue length by correcting said lower bound and said upper bound via subtraction of the number of the detected information units transmitted from said second point to said first point.

2. The method of claim 1, comprising computing an improved estimate on said queue length at a time by computing said lower, respectively upper, bound of the queue length as a maximum, respectively a minimum, of a difference between the lower, respectively the upper, bound for said quantized queue length information as provided by said second point at an earlier time and a total number of the detected information units transmitted from said second point to said first point over an interval between said earlier time and said time.

3. The method of claim 1, comprising:
detecting said improved estimate of said queue length becoming inconsistent due to a respective lower bound becoming higher than a respective upper bound; and
restarting computing said improved estimate of said queue length by restarting correcting said lower bound and said upper bound by subtraction of the number of the detected information units transmitted from said second point to said first point.

4. The method of claim 3, comprising taking said improved estimate becoming inconsistent as representative of at least one new information unit having joined said queue.

5. The method of claim 1, comprising, when an arrival process of said information units at said second point is periodic:

producing said improved estimate of said queue length by periodically increasing the queue length by a fixed amount and subtracting the number of detected information units transmitted from said second point to said first point;

comparing said improved estimate of said queue length with said quantized queue length information from said second point; and when a mismatch is detected as a result of said comparing, inferring one of an onset and a termination of periodic arrival of said information units at said second point.

6. The method of claim 1, comprising sending from said first point to said second point, scheduling information for transmitting said information units from said second point to said first point, said scheduling information being generated as a function of said improved estimate on said queue length.

7. The method of claim 6, wherein said first point predicts, as a function of said improved estimate on said queue length, an expected status of said queue and sending proactive scheduling information for transmitting said information units from said second point to said first point as a function of said predicted expected status.

8. The method of claim 1, comprising receiving said information units at said first point as uplink packet traffic in said communication network.

9. The method of claim 8, comprising selecting as said first point a NodeB in HSUPA or LTE.

10. A node in a communication network, said node capable of receiving from a user in a network, information on a length of a queue of information units to be transmitted to said node from said user, said information being in the form of quantized queue length information indicative of a lower bound and an upper bound for said queue length, comprising a node configured for performing the method of claim 1.

11. A non-transitory computer-readable medium, loadable in the memory of at least one computer and comprising software code portions capable of performing the method of claim 1.

* * * * *